United States Patent [19]

Nakata et al.

[11] 3,801,041

[45] Apr. 2, 1974

[54] LEADER TAPE GUIDING APPARATUS

[75] Inventors: Yoshinobu Nakata, Osaka; Michinori Nagahiro, Nishinomiya, both of Japan

[73] Assignee: Matsushita Electric Industrial Co., Ltd., Osaka, Japan

[22] Filed: Nov. 28, 1972

[21] Appl. No.: 310,020

[30] Foreign Application Priority Data

Dec. 1, 1971 Japan .............................. 46-97369

[52] U.S. Cl. .................................. 242/195, 226/91

[51] Int. Cl. ......................... G03b 1/04, G11b 15/32

[58] Field of Search ............................ 242/195–200; 352/157, 158; 226/91; 274/4 B

[56] References Cited

UNITED STATES PATENTS 3,195,825 7/1965 Louzil ................................ 242/195

3,379,387 4/1968 Takahashi ........................... 242/195

3,539,132 11/1970 Smitzer .............................. 242/195

*Primary Examiner*—Leonard D. Christian

*Attorney, Agent, or Firm*—Stevens, Davis, Miller & Mosher

[57] ABSTRACT

In an automatic tape loading apparatus in which a leader tape having rigidity and affixed to the end of magnetic tape is guided to a takeup reel by means of a leader guide, an auxiliary guide is provided between the leader guide and a cartridge accommodating therein a supply reel so as to securely guide the leader tape running out of the cartridge into the leader guide.

8 Claims, 9 Drawing Figures

LEADER TAPE GUIDING APPARATUS

The present invention relates to an automatic tape loading apparatus using a magnetic tape to the end of which a leader tape having an appropriate rigidity and a width slightly greater than that of the magnetic tape is stuck, and more particularly to a leader tape guiding apparatus which is so designed as to securely guide to a leader guide a leader tape running out from a supply reel when a loading operation is initiated.

An automatic tape loading apparatus typical in the prior art is a system in which a leader tape having a suitable rigidity and affixed to the end of a magnetic tape is first guided from a supply reel through a predetermined leader tape guiding passage to a take-up reel by the help of the rigidity of the leader tape. The leader tape guiding passage is a rectangular duct called "leader guide," which defines therein a space enough to let the leader tape pass therethrough and has a slit opening in one wall thereof, the width of which is slightly greater than that of the magnetic tape but slightly smaller than that of the leader tape. Therefore, only the magnetic tape can freely escaped from the leader guide through the slit opening to be guided along a predetermined passage.

In order to securely guide the end of the leader tape from a cartridge having therein a supply reel into the leader guide with such a structure as described above, it is only necessary to provide the entrance of the leader guide in the vicinity of the opening of the cartridge through which the leader tape runs out. However, such an arrangement of the leader guide is hardly possible since in an ordinary magnetic recording and reproducing apparatus in current use a tension pin is provided near the supply reel to control the tension of tape. Namely, it is not improbable that the leader tape from the supply reel may be misdirected and deviated from the leader guide when the end of the leader tape hits upon the tension pin.

Moreover, since the magnetic tape following the leader tape runs, escaping from the leader guide, along the slit opening thereof, the running of the magnetic tape becomes unstable due to the contact between the edges of the opening and those of the tape. These mentioned above are a serious drawbacks inherent to the prior art system.

It is therefore one object of the present invention, which has been made to eliminate such difficulties as suffered by the prior art system, to provide an arrangement in which the leader tape is securely guided into the leader guide by interposing an auxiliary guide plate between the entrance of the leader guide and the opening of the cartridge containing a supply reel when the leader tape is to be guided.

Another object of the present invention is to provide an arrangement in which the running of the magnetic tape following the leader tape is not distrubed by the leader guide at all.

Other features and advantages of this invention will be apparent from the following detailed description of the preferred embodiments.

As described above, according to the present invention, the auxiliary guide is so moved only when the leader tape is to be guided that the tension pin may be placed outside the passage of the leader tape. Accordingly, the end of the leader tape never hit the tension pin so that misthreading is prevented, and moreover the function of the tension pin during recording and reproduction is not disturbed.

For the better understanding of the present invention, reference may be had to the accompanying drawings in which the same reference numerals are applied to like parts and in which.

Figure 1:
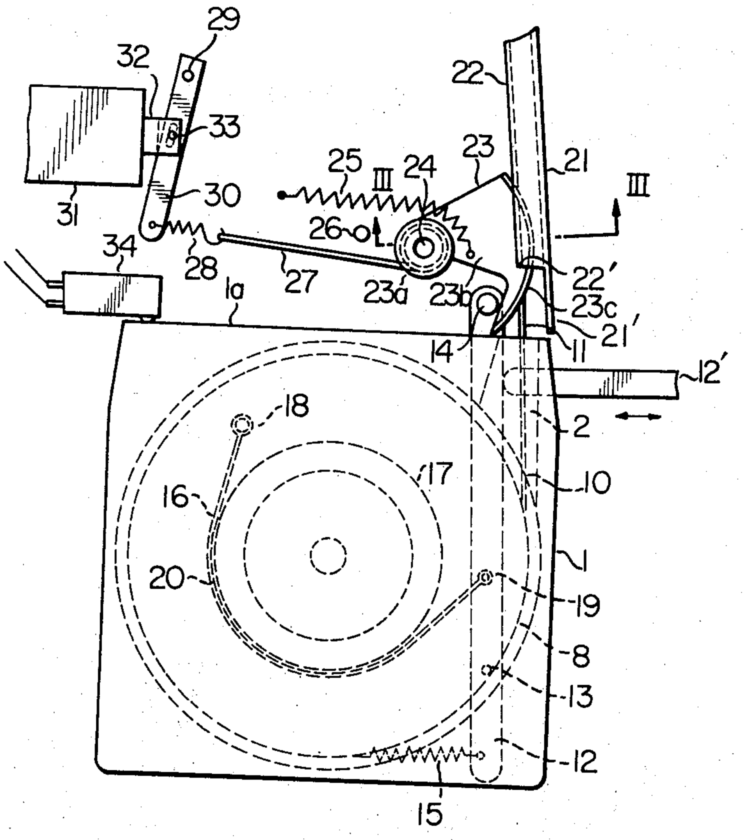
FIGS. 1 and 2 are schematic views which show respectively two actuated states of a leader tape guiding apparatus according to the present invention.
Figure 2:
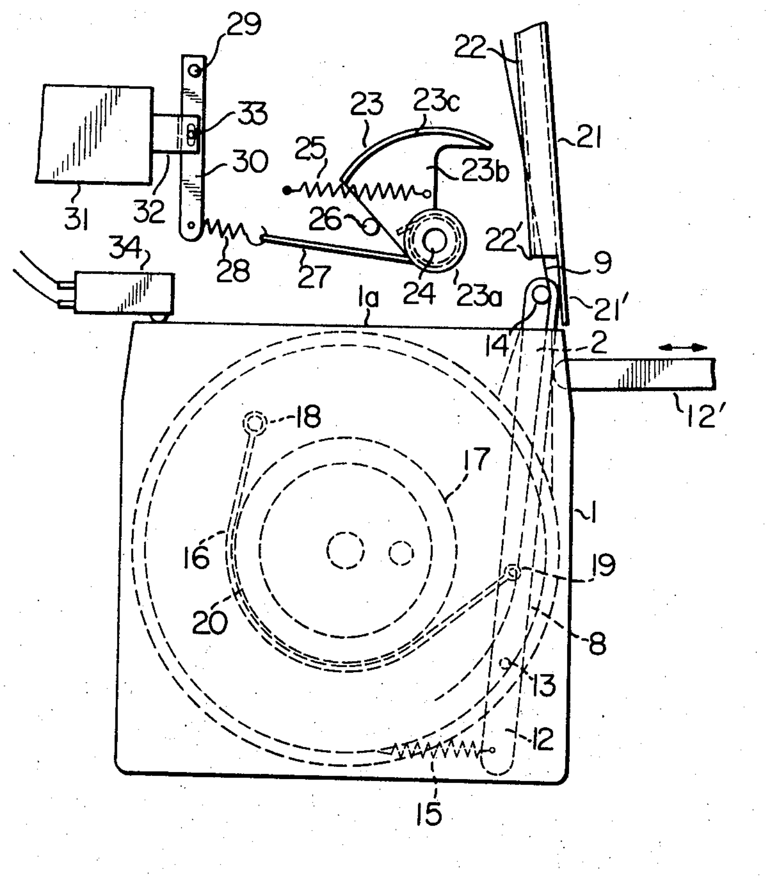
Figure 3:
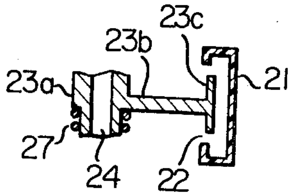
FIG. 3 is a cross sectional view taken along the line III — III in FIG. 1.
Figure 4:
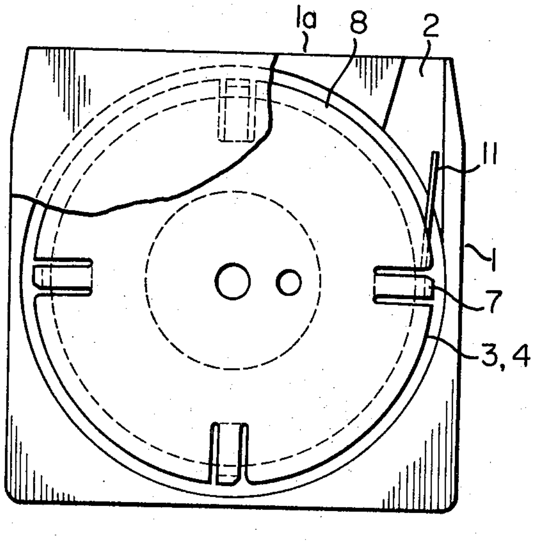
FIG. 4 is a plan view, partially broken, of an exemplary cartridge used in the leader tape guiding apparatus according to the present invention.
Figure 5:
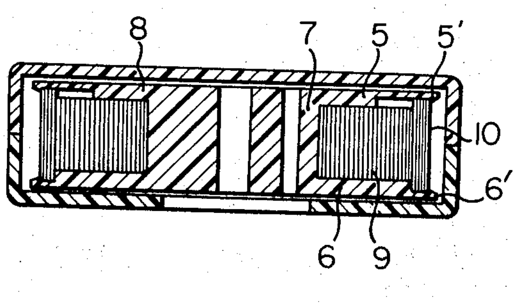
FIG. 5 is a cross section of the cartridge shown in FIG. 4.
Figure 6:
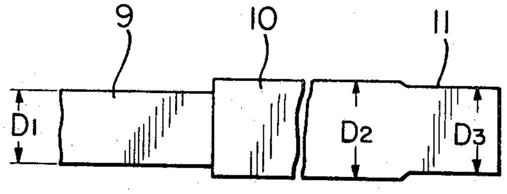
FIG. 6 is a plan view showing the end portion of a tape loaded in the cartridge shown in FIG. 4, together with a leader tape to be associated therewith.

Referring to FIGS. 4 and 5, a cartridge 1 having an opening 2 through which a leader tape runs out, accommodates therein a supply reel 8 comprising an upper flange 5, a lower flange 6, a hub 7 and leader retaining ridges 5' and 6'. The supply reel 8 has a length of magnetic tape 9 and a short length of leader tape 10 wound thereon, the magnetic tape 9 having a width of $D_1$ and the leader tape 10 with an appropriate rigidity and a width of $D_2$ being wider than the tape 9 and stuck to the free end of the tape 9. The end 11 of the leader tape 10 has such a width $D_3$ that it may not be engaged with the leader retaining ridges 5' and 6' but that it may be wider than the tape 9, i.e. $D_2 > D_3 > D_1$, as shown in FIG. 6. Accordingly, when the supply reel 8 is rotated in the reverse direction, the leader tape 10, due to its rigidity, runs out through the opening 2 from its end 11 successively. A tension lever 12 is mounted rotatably on a shaft 13. The tension lever 12 has at one of its ends a tension pin 14 and is engaged at its remaining end with a spring 15, which urges the tension lever 12 so that it may rotate in the clockwise direction. Moreover, according to the design, during recording and reproducing operations, the tension lever 12 rests in such a position that the tape 9 and the tension pin 14 may engage with each other, as shown in FIG. 2, and during the other operation, the lever 12 is engaged with an escape member 12' cooperating with a recording or reproduction button (not shown), as shown in FIG. 1. A band 16 which is fixed at one of its ends to a shaft 18 and at the other end to a shaft 19 provided on the tension lever 12, is wound about a supply reel support 17 so that a braking force is applied to the support 17 by means of a friction belt 20 provided on the band 16 due to the urging force of the spring 15 so as to provide backward tension for the tape 9. A leader guide 21, the principal portion of which is shown in cross section in FIG. 3, has a slit opening 22 whose width is slightly smaller than that of the leader tape 10 but greater than that of the tape 9 so that the leader tape 10 can be conveyed through the guide 21 without going out of it while the tape 9 can be freely slipped out of it through its opening 22. As shown in FIG. 1, the leader guide 21 is so arranged that one end 22' of the slit opening 22 of the guide 21 may be kept at a distance from the opening 2 of the cartridge 1 through which the tape runs out and that only the wall 21' of the guide 21 may be extended closely to the cartridge 1.

An auxiliary guide 23, which is one of characterizing devices of the present invention and the principal portion of which is shown in cross section in FIG. 3, comprises a boss 23*a*, a flange member 23*b* and an arcuate member 23*c* having a width smaller than that of the slit opening 22 of the leader guide 21. The auxiliary guide 23 is mounted rotatably on a shaft 24 and urged in the counterclockwise direction by means of a spring 25. The auxiliary guide 23 is prevented from rotating by means of a stopper 26 and rests in the first position where the arcuate member 23*c* is far from the slit opening 22 of the leader guide 21, as shown in FIG. 2. A length of string 27 has one of its ends connected with a spring 28 linked to the end of a lever 30 swingably supported about a shaft 29 and the other end, which is wound about the cylinder member 23*a*, fixed to the flange member 23*b*. A solenoid coil 31, when energized, actuates a plunger 32 engaged with the lever 30 by means of a pin 33. If the plunger 32 shifsts leftward into the solenoid coil 31, the lever 30 rotates clockwise. Accordingly, the string 27 is pulled by means of the spring 28 coupled to the end of the lever 30. Since in this case the spring 28 is sufficiently stronger than the spring 25, the auxiliary guide 23 is rotated clockwise against the force of the spring 25 and assumes the second position as shown in FIG. 1. In this position, the arcuate member 23*c* of the auxiliary guide 23 comes into the leader guide 21 as if it closes a part of the slit opening 22.

A microswitch 34 makes a circuit when a cartridge 1 is loaded. This microswitch 34 and the solenoid coil 31 are connected in series circuit with another microswitch (not shown) so designed as to break the circuit due to the swing of a lever (not shown) associated with a take-up reel (not shown) which lever is swung when a sufficient length of the leader tape 10 is wound about the take-up reel. Therefore, when the cartridge 1 is loaded, the solenoid coil 31 is energized and when a sufficient length of the leader tape 10 is wound on the take-up reel, the solenoid coil 31 is deenergized.

Now, the operation of the mechanism described above will be explained. The auxiliary guide 23 assumes its first position, as shown in FIG. 2, when a cartridge is not loaded. If a cartridge is loaded, the microswitch 34 is closed so that the solenoid coil 31 is energized to attract the plunger 32 thereinto. Consequently, the lever 30 engaged via the pin 33 with the plunger 32 is rotated clockwise to pull the string 27 leftward with the aid of the spring 28. Since the spring 28 is much stronger than the spring 25, that length of the string 27 wound about the boss 23*a* is unwound which is equal to the distance of translation of the end of the string 27 linked to the spring 28. Accordingly, the auxiliary guide 23 is rotated clockwise so that the arcuate member 23*c* swings through the slit opening 22 into the leader guide 21, as shown in FIG. 1, to seize the tension pin 14 in the inside of the arcuate member 23*c* and therefore swing the tension lever 12 counterclockwise. The clockwise rotation of the auxiliary guide 23 is limited by the side wall 1*a* of the cartridge, that is, the guide 23 stops rotating when it is brought into contact with the side wall 1*a* of the cartridge 1, as shown in FIG. 1. If the lever 30 is further swung clockwise after the contact has been established, then the spring 28 expands accordingly. Thus, the auxiliary guide 23 assumes its second position, as shown in FIG. 1. If the supply reel 8 is rotated in the forward direction with the auxiliary guide 23 kept in the second position, the end 11 of the leader tape 10 runs out through the opening 2 of the cartridge 1. Now, since the auxiliary guide 23 is in the second position, that is, the tension pin 14 is outside the leader tape passage constituted of the arcuate member 23*c* of the auxiliary guide 23 and the leader guide 21, the end 11 of the leader tape 10 is smoothly conducted by the help of the arcuate member 23*c* into the leader guide 21. As mentioned above, if a sufficient length of the leader tape 10 is wound about the take-up reel, then the solenoid coil 31 is deenergized so that the plunger 32 is no longer attracted. Consequently, the auxiliary guide 23 is rotated counterclockwise by means of the spring 25 until it is stopped by the stopper 26. Finally, the auxiliary guide 23 assumes the second position, where it does not prevent the tension pin 14 from coming in contact with the tape 9.

In the above described embodiment, the tension lever 12 is so designed as to be actuated by a lever 12' associated with the operating button except when recording or reproduction takes place. However, the tension lever 12 may be so arranged as to be shifted by the auxiliary guide 23 engaged with the lever 12.

Moreover, in the above described embodiment, the solenoid coil 31 is deenergized by a microswitch operating upon detecting that a certain length of leader tape is wound on the take-up reel. It is, however, understood that the microswitch may be replaced by a retardation relay which breaks circuit after a delay time equal to the time during which a sufficient length of the leader tape 10 is fed into the leader guide 21.

Figure 7:
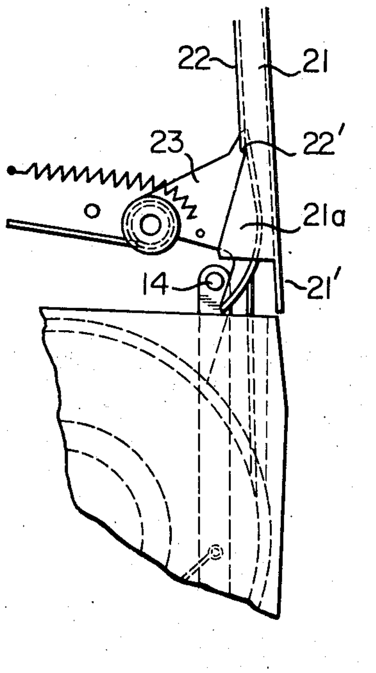
FIGS. 7 and 8 are schematic views which show respectively two actuated states of another leader tape guiding apparatus embodying the present invention.
Figure 8:
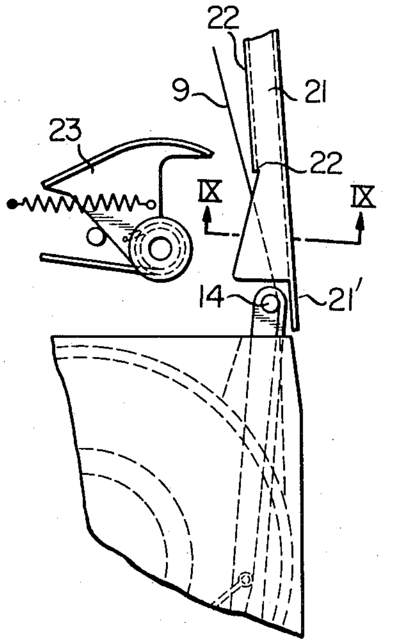
Figure 9:
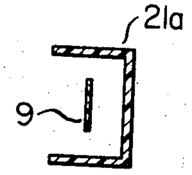
FIG. 9 is a cross sectional view taken along the line IX — IX in FIG. 8.

FIGS. 7 to 9 show another embodiment of the present invention. The difference in this embodiment from that described above is the provision of an additional guide member 21*a* on the extended part of the wall 21' of the leader guide 21 of the previous embodiment, the cross section of the additional guide member 21*a* taken along the line IX — IX in FIG. 8 being shown in FIG. 9. The magnetic tape 9 is led via the guide member 21*a* to the predetermined proper passage. With this structure, the tape can be prevented from being contacted with the leader guide 21 even if the tape 9 fluctuates to some extent.

What we claim is:

1. A leader tape guiding apparatus comprising a supply reel having a magnetic tape and a leader tape stuck to the end of said magnetic tape wound thereon, said leader tape being wider than said magnetic tape;

a cartridge accommodating therein said supply reel and having an opening through which said tapes run out;

a leader guide to guide said leader tape running out of said cartridge through said opening to said take-up reel, said leader guide defining a passage for said leader tape and having a slit opening whose width is slightly greater than that of said magnetic tape but slightly smaller than that of said leader tape, and there being a small gap provided between the end of said slit opening and said opening of said cartridge; and an auxiliary guide so arranged as to be swung into said gap when said leader tape is to be guided.

2. A leader tape guiding apparatus as claimed in claim 1, wherein the wall of said leader guide opposite to the wall thereof having said slit opening is closer to said opening of said cartridge than said wall having said slit opening.

3. A leader tape guiding apparatus as claimed in claim 1, wherein said auxiliary guide is moved according as said cartridge is loaded.

4. A leader tape guiding apparatus as claimed in claim 1, wherein a tension post is provided in said gap and a means is further provided to move said tension post outside said auxiliary guide when said leader tape is to be guided.

5. A leader tape guiding apparatus as claimed in claim 4, wherein said tension post is associated with said auxiliary guide and the former is moved in response to the movement of the latter.

6. A leader tape guiding apparatus as claimed in claim 1, wherein said magnetic tape following said leader tape is passed across said gap.

7. A leader tape guiding apparatus as claimed in claim 1, wherein said auxiliary guide is moved into said gap when said cartridge is loaded and removed from said gap when said leader tape reaches the take-up reel and is wound thereon.

8. A leader tape guiding apparatus as claimed in claim 1, wherein said auxiliary guide is moved into said gap when said cartridge is loaded and removed from said gap after a predetermined time from the start of said leader tape being guided out.

* * * * *